Sept. 9, 1930.  R. EMERY  1,775,363
TYPOGRAPHICAL MOLD
Filed Sept. 16, 1926  6 Sheets-Sheet 2

INVENTOR
Roy Emery
BY
Charles F. Wilcox
HIS ATTORNEY

INVENTOR
Roy Emery
BY
Charles P. Wilcox
HIS ATTORNEY

Sept. 9, 1930.   R. EMERY   1,775,363
TYPOGRAPHICAL MOLD
Filed Sept. 16, 1926   6 Sheets-Sheet 5

INVENTOR
Roy Emery
BY
Charles P. Wilcox
HIS ATTORNEY

Patented Sept. 9, 1930

1,775,363

UNITED STATES PATENT OFFICE

ROY EMERY, OF BROOKLYN, NEW YORK

TYPOGRAPHICAL MOLD

Application filed September 16, 1926. Serial No. 135,976.

This invention relates to typographical machines in which matrices are composed and presented in justified lines in casting mechanism.

The invention herein described is auxiliary to and comprises certain modifications of the invention described and shown in Patent No. 1,607,252, issued November 16, 1926, for mold elements for casting justified lines of single type, logo-types, words, divided lines, slugs and type bars.

The primary object of this invention is to provide a simple and efficient composite mold whereby type may be cast in justified lines of single characters, logotypes, divided lines, or integral type bars; or mixed lines embodying one or more of the said classes and to eliminate the use of mold liners.

A further object is to provide means of the character described by which the aforesaid object can be attained by the simple expedient of selection of suitable matrices, and which may be utilized without readjustment of the mechanism of the machine in which my matrices are employed, such as changing liners, etc.

A further object is to provide matrices of the character and for the purposes described adaptable to be employed in various typographical machines in which circulating matrices are employed, also in such machines as employ hand-set matrices.

A further object is to provide a matrix without a wall for casting type characters and which may be used with or without separate dividing walls.

A further object is to provide an adjustable spacer adapted to be employed in conjunction with the matrices, dividing walls and spacing matrices embodied in this invention whereby justified lines may be cast comprising any of the classes of composition contemplated and described and shown herein.

A further object is to provide matrices, spacing matrices, divided walls, and adjustable spacers in double form whereby two styles or sizes of characters may be employed by reversing the units of a set employed in my system.

A still further object is to provide means whereby a line of type matrices may be set in a stick in such a manner that it can be disposed in a casting machine, and consecutive casts made therefrom without distributing, as in casting ornamental designs or casting characters for a font.

And still further, the object is to provide means whereby a line of type matrices may be set in a stick for casting in a machine used for casting from hand-set matrices, in which closely set italic characters may be reproduced.

And a still further object is to design a stick or holder in which the particular forms of matrices, and auxiliary units employed in my system can be conveniently assembled and locked for casting.

And a still further object is to provide means of casting slugs with high or low quads without changing the machine or mold.

And a still further object is to provide matrices in which the surface used in casting are not exposed to wear and damage in passing through the machine.

With these and other objects in view, reference may be had to the accompanying drawings, forming a part of this specification, in which Fig. 27$^a$ is a sectional view similar to Fig. 26 showing the adaptation of my system of matrices and casting molds to casting italic characters.

In the drawings forming a part of this specification, similar reference characters designate similar parts throughout the numerous views, excepting in the modified forms of the invention herein described, in which case distinguishing reference characters are employed thereof.

My invention consists essentially and primarily in means for forming a composite matrix or mold whereby type may be cast in an integral line or divided between words or letters or cast as a line of single type, utilizing a mold element which has a matrix and forms the character and one side of the body of the type, together with auxiliary elements as spacing means and division walls and a mold wall and foot plate. For this reason the different forms of matrices, spacers and division walls, whether for hand-setting or for machines in which circulating matrices are employed, are all equally generic in my invention, and it is inconsistent to use the customary phrase: "Preferred form" in speaking of any class of matrices whether designed for hand setting or for circulating in machines in which circulating matrices are employed. Hence although the hand-set matrices are differently shaped from the circulating matrices, the difference in shaping the matrices is merely adaptation of my generic invention to the various applications of the invention; the essential part is the casting chamber. In like manner, the adaptation of the invention to various forms of circulating matrices, as shown in Fig. 1, and Figs. 13, and 14 and 15, constitutes no fundamental part of my invention, for the reason that the said adaptations, are illustrated for the sole purpose of making clear the broad application of my invention, whereby it is rendered adaptable to be used in various forms of type casting machines, whether hand set matrices or circulating matrices are employed therein.

With this understanding of the object and scope of this invention, which is to devise a means for casting justified lines of type integrally or divided at will, it must be obvious that the various adaptations, either in the shape of the matrices and auxiliary elements, or the adaptations of the appliances and devices and mechanism required to employ or utilize the same are all subordinate to or a part of the primary or fundamental invention herein described and shown.

Figures 29, 30, 31, 32, 33, 34, 35:
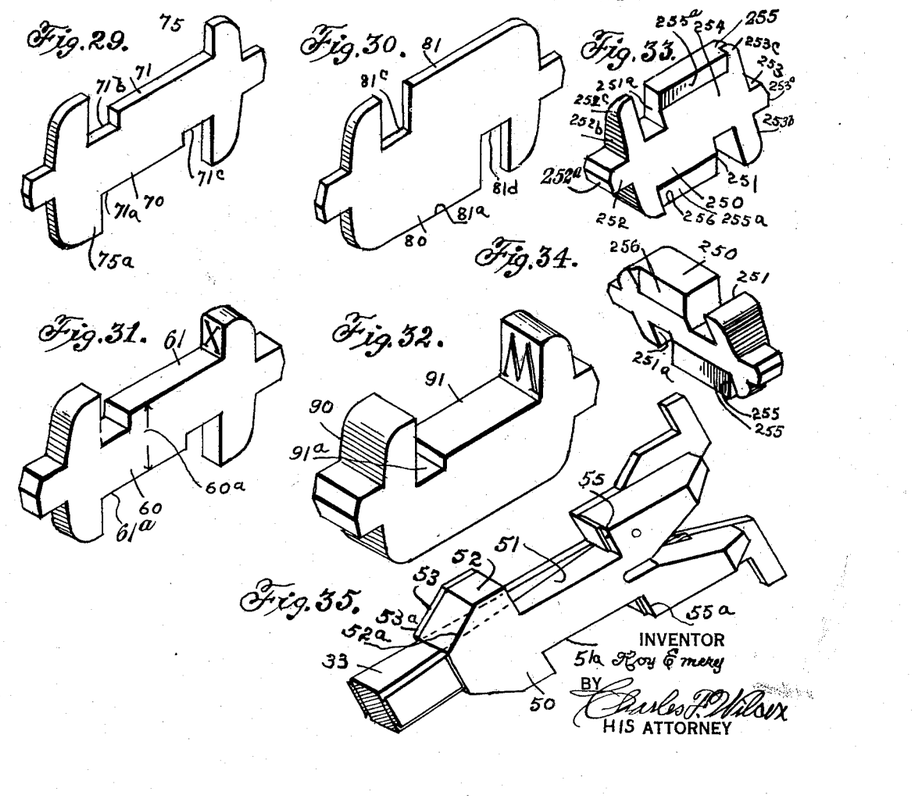
Fig. 29 is a double spacing matrix for hand setting.
Fig. 30 is a double dividing wall for hand setting.
Fig. 31 is a double character matrix for hand setting.
Fig. 32 is a character matrix for hand setting, adapted for larger type.
Fig. 33 is a perspective view of an italic rectifying wall.
Fig. 34 is an inverted view of the italic rectifying wall shown in Fig. 33.
Fig. 35 is a perspective view of a modified form of the adjustable spacer made double and adapted for two sizes of type.

The primary form of my invention, or the matrices, forming the mechanical basis thereof, and the auxiliary elements and the product obtained thereby are shown in Figures 1 to 12 inclusive, 16 to 22 inclusive and in Figure 35.

Figures 1, 2, 3:
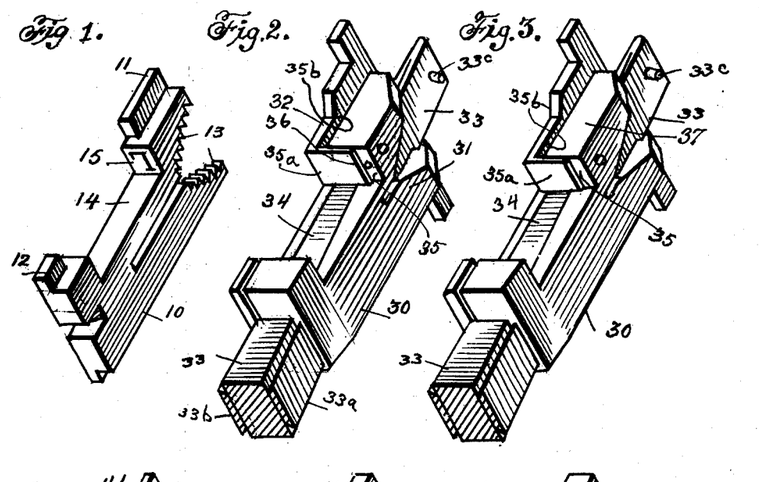
Figure 1 is a perspective of the character matrix employed in this invention.
Fig. 2 is a perspective view of the adjustable matrix of the class adapted to carry a character.
Fig. 3 is a perspective view of the adjustable space matrix.

Figure 1 is a perspective of my improved matrix adapted for machines employing the most common form of circulating matrices. The term "matrix" as here used, means not only a mold element which carries a strike, but which forms one or more sides of the type cast as well as the face.

Figures 13, 14, 15:
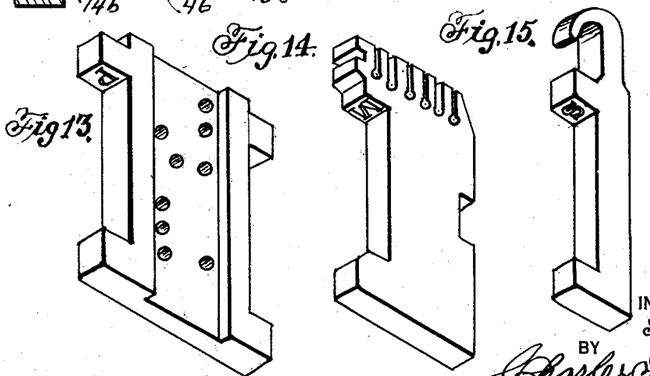
Figs. 13, 14 and 15 are views of modified forms of the matrix.
Figures 16, 17:
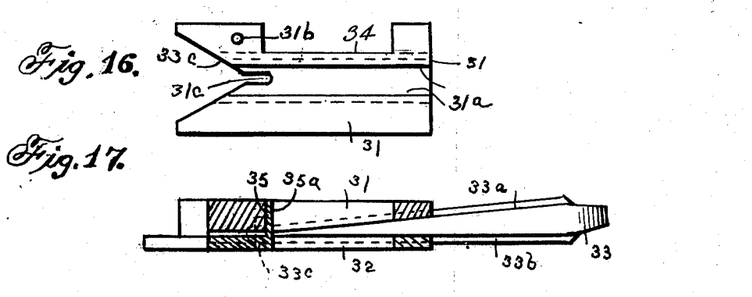
Fig. 16 is a detail view showing the inner surface of the block of the adjustable spacer.
Fig. 17 is a longitudinal sectional view of the adjustable spacer taken on line XVII—XVII of Fig. 21.
Figures 18, 19:
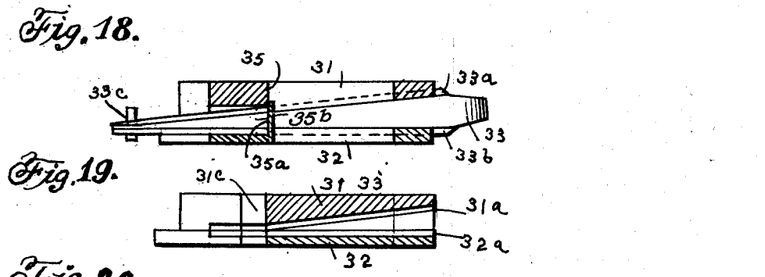
Fig. 18 is a longitudinal sectional view of the adjustable spacer taken on line XVII—XVII of Fig. 21 but in an expanded position of adjustment and with the wedge inserted.
Fig. 19 is a longitudinal sectional view of the adjustable spacer with wedge removed on line XX—XX of Fig. 21.
Figure 20:
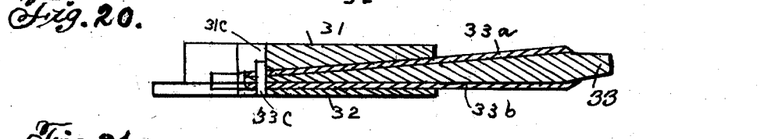
Fig. 20 is a longitudinal sectional view of the adjustable spacer on line XX—XX Fig. 21.
Figure 21:
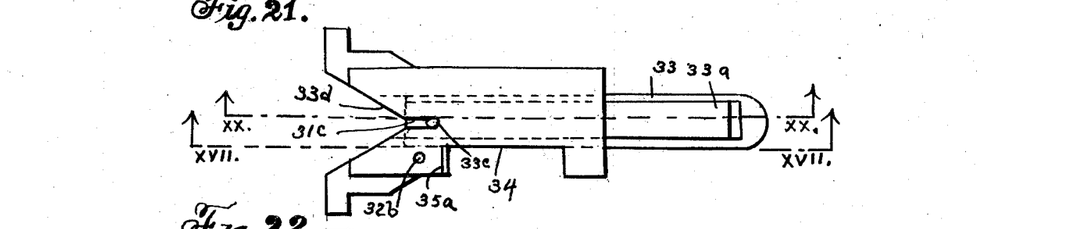
Fig. 21 is a plan of the adjustable spacer with wedge extended.
Figure 22:
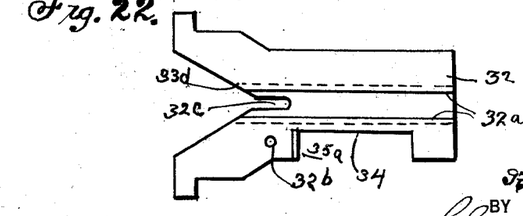
Fig. 22 is a plan of the interior surface of the lug member of the adjustable spacer.

In Figures 13, 14, and 15 I have illustrated adaptations of my matrices to typographical machines which employ novel forms of circulating matrices. In Figure 13 is shown a modified form of the mold element adapted to circulate in the machine patented by D. Petri-Palmedo and E. F. Goddard, Feb. 15, 1916, No. 1,171,537. The illustration is here presented, not to appropriate in any degree show the broad adaptability of my invention.

In Figure 14 is shown a modified form of the mold element adapted to circulate in the machine patented by F. H. Brown, J. E. Hanrahan and J. L. Seller, May 18, 1909, No. 921,946. The illustration is here presented, not for the purpose of appropriating in any degree the invention of said patentees, but only for the purpose of showing the broad applicability of my invention.

In Figure 15 is shown a modified form of the mold element adapted to circulate in the machine patented by W. S. Scudder, October 3, 1893, No. 506,198. The illustration is here presented, not to appropriate in any degree the invention of said patentee but only to show the broad applicability of my invention.

I have not deemed it necessary to illustrate the modified forms of the auxiliary parts, suitable to be used with the forms of my matrices shown in Figures 13, 14, and 15, as it is very obvious it would involve unnecessary multiplicity of views and amount to no more than an exhibition of ingenuity in designing details and forms which is unessential in this particular phase of my application.

In Figure 31 of the drawings is shown a modified form of mold element to be used for casting in machines of the class for casting type from hand-set matrices. The various adaptations of this class of matrices and auxiliary units, parts or elements, as spaces or quads, and division walls and other appliances and features are illustrated in Figures 23 to 34 inclusive, and 36 to 41 inclusive.

Referring to Figure 1 of the drawings, the numeral 10 indicates the matrix proper, which is provided with ears 11, toes 12, teeth 13 and a recess 14, in one side thereof, or, in my double matrices, in both sides thereof, and formed parallel with the longitudinal axis of the matrix. A shoulder 15 is formed by the recess and in the under surface thereof is formed the "strike" or character to be molded in type, as "L". These matrices may be set to form a line from which type may be cast.

Figure 9:
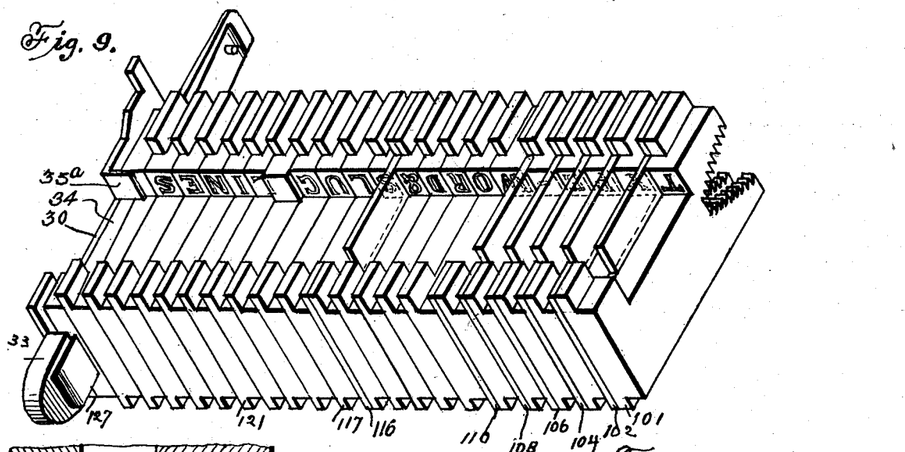
Fig. 9 is an isometric perspective showing a line of matrices arranged in the order in which the casting is made to produce the product shown in Fig. 8, though on a different scale.

In Figure 9 of the drawings I have shown matrices set in a line for casting. The matrices as assembled in line will form single type, a single word, and a slug, or part of a line containing more than one word in a single body or slug when cast. The units assembled in this line will produce type characters in the several classes, reading:

"TYPE—WORD & SLUG LINES."

These units are numbered 101 to 127, numbering 27 units in all, each class or form of which will be hereinafter more fully explained.

Figures 4, 5, 6, 7, 8:
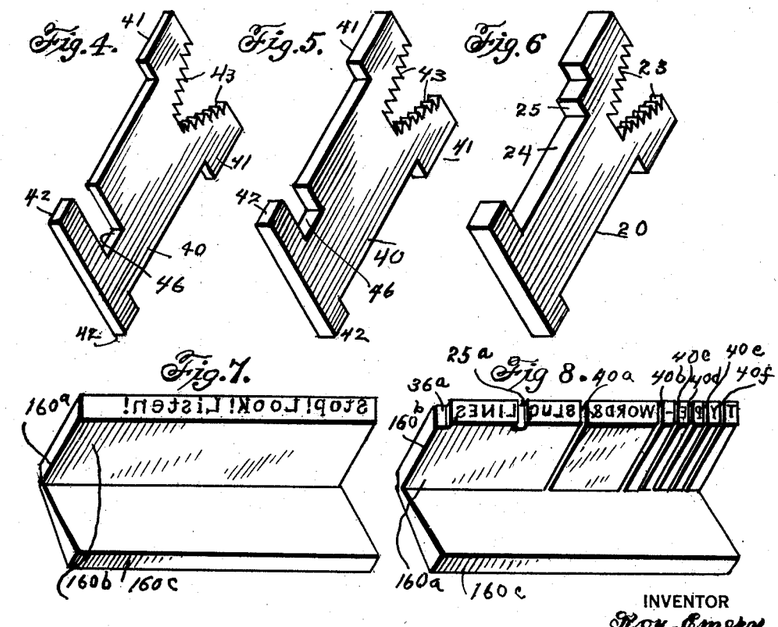
Fig. 4 is a view of a dividing wall.
Fig. 5 is a view of a dividing wall of a modified form.
Fig. 6 is a view of a spacing matrix.
Fig. 7 is a view of a type bar cast by my method.
Fig. 8 is a view of the product cast by my method in which there are single characters or letters, a single word and a divided line.

In Figure 8 of the drawings, drawn to slightly smaller scale, the product cast from the assembly shown in Figure 9, is illustrated. In this figure it is seen that the letters of the word "T Y P E" are cast as single type, each character having its own body. Also the letters in "W O R D" are cast in a solid body as one word with the ampersand (&) included therewith as, "WORD &". And again the words "S L U G L I N E S" both appear upon a slug or a part of a line of type, representing the manner of casting lines or parts of lines, as in slug-casting machines. The entire line is cast with a single tang, 160°.

It is thus shown a line may be cast integrally, or divided at will to form single letters, single words, etc. For simplicity of illustration a composite line has been shown embodying all the several classes, as: single type, single words, and divided line. This composite line illustrates the essentials of the invention as represented in the matrices and the auxiliary elements, or units, as spaces, division walls, and adjustable or justifying spacers, and illustrates the classes of product of the invention.

In Figure 7 of the drawings is shown the product of a different line of matrices, cast as an integral line of type reading "S t o p! L o o k! L i s t e n!"

For clearness the method of producing each class of the product, as single body type, single words, or divided lines and slugs or slug lines, and full lines of type in one body, will be separately described, as follows:

*To cast integral lines*

To cast an integral line the matrices are set one against the other, except where a quad or spacer is required, as in Fig. 9 between the words "S L U G" and "L I N E" or in any case as may be between letters or groups of characters.

For convenience numerals are used to designate the units in Figure 9, beginning with 101 at the right and reading to the left, up to 127, there being 27 units in the assembly shown in the figure. Beginning at matrix number 117 which is "S", the beginning of the word "Slug", the remainder of the line is cast integrally, therefore the matrices are set compactly one against the other, excepting where the space between the words "S L U G" and "L I N E" occurs. Here a spacer of required thickness is inserted, as element No. 121. See also Figure 6, of the drawings. The spacer 20, Fig. 6, is substantially the same as the matrix 10, excepting that it carries no character strike and the shoulder 25 on the spacer extends farther down, shortening the recess 24 at its upper extremity more than the shoulder 15 of the matrix 10 does the recess 14 thereof. This results in producing a lower type body where the spacer is, as 25$^a$ (see Figure 8).

These spacers or quads may be provided in standard or usual thickness of spacing matrices, in quads and thin spaces.

An adjustable spacer, as 30, is provided, No. 127 in Figure 9, which will be more fully explained hereinafter, having a recess 34, and a shoulder 35 in which a character may be provided, as indicated by the period or leader 36 in Fig. 2.

It will be observed that the recesses of the matrices, spaces, and adjustable spacer, where these elements, as number 117 to 127, are assembled in a line, form a continuous plane surface suitable for molding an integral line, or a part of a line.

The assembled line as shown in Figure 9 is put in the first elevator, moved to the casting position, firmly gripped between vise jaws (not shown) and a cast made in the usual manner. The ends of the line cast may be formed either by these vise jaws or by wall elements.

To cast separate words

To cast separate words, the matrices for each word are assembled in a group in the same manner that is used for casting integral lines except that a dividing wall, as 116, Fig. 9, is inserted between each pair of words. The dividing walls, as shown in Figures 4 and 5, are preferably thin, and used for separating the single body characters, or words or other groups of characters or words in the line, but they may be made of any preferred thickness. The wall 40 is provided with ears 41, toes 42, and teeth 43. They also have a recess 46 which may be any depth desired for admitting the foot plate of the casting mechanism 150, shown in Figure 10, which will be explained hereinafter.

The wall 40 is not recessed above the recess 46 as are the matrices 10 and the spacer 20, but is of full width at this place so that it extends outwardly between the recesses of the matrices or spacers when assembled in line therebetween, so that the product of the casting operation is severed or divided at the places where the walls occur, as shown by the recess 40$^a$ in Figure 8, but the parts of the cast are connected by the tang which is not necessarily the same length as the type line, but may be a constant length, that of the longest line of type the machine will cast. In cases of shorter lines, the tang extension may be cast against the vise jaw.

To cast single type

To cast single type the method is the same as that required to cast single words, only a dividing wall is inserted after each character matrix, as letters, figures or ligatures, as shown in Fig. 9, elements 102, 104, 106, 108 and 110 forming a wall or partition between the character matrices, resulting in the product shown in Figure 8, with a recess between all characters in a word or other group of characters, as 40$^a$, 40$^b$, 40$^c$, 40$^d$, 40$^e$, and 40$^f$.

The recess 36$^a$ in the product shown in Fig. 8 is formed by extension 35$^a$ of the adjustable spacer 30 shown in Fig. 9.

For use in cases where it is not desired to cast a character by means of the adjustable spacer a spacer is provided of a slightly modified form, as shown in Figure 3, in which the shoulder 37 extends lower and forms a recess in the product corresponding with the recess 25$^a$ of Figure 8 formed by the shoulder 25 of the spacer 20 shown in Figure 6.

It has thus been shown how characters may be cast all in one type body or slug by placing the matrices in juxtaposition; it has also been shown how groups of characters or words may be cast on smaller type bodies in a single unit by means of dividing walls and it has been further shown how any character may be cast upon a single body by the simple expedient of disposing a dividing wall on each side of the matrix from which it is to be cast and when a series of single type are to be cast, by disposing one of said dividing walls between succeeding matrices in a word, group or line.

While the drawings show only a line of composition, this is only for simplicity in the drawings, by which it is illustrated in a single line, the manner in which single characters, groups of characters or words, or slug lines or divided slug lines may be produced by my method, still it will be seen how by the same method, a full line may be set or composed of single characters, single words or groups of characters and any combination of single characters, words or groups of characters can be set in slug line or fractional parts of lines. All these results are obtainable by means of the matrices as in Figure 1 and other views; the adjustable spacers, as in Figure 2, 3, and 35; the spacers, as in Figure 6 and other views; the dividing walls, shown in Figures 4 and 5, and the modified forms of these elements shown in other views of the drawings.

Figures 10, 11:
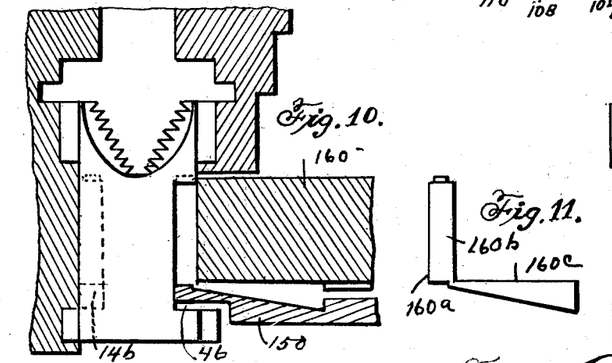
Fig. 10 is a detail view showing the position of the matrix in the composing chamber ready for casting, the foot member and body member being in position for casting.
Fig. 11 is a view of the product cast.
Figure 12:
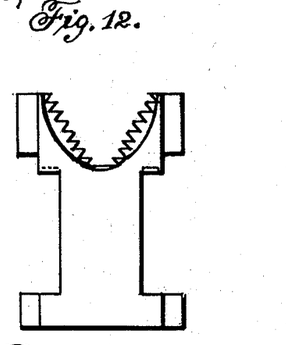
Fig. 12 is a view of a double matrix.

In the practice of my invention the composed line of type matrices is disposed in the first elevator and moved to the casting position as shown in Figure 10 and the casting means brought to the position shown with the body block 160 against the matrices, spacers and division walls and the foot plate 150 in the recess 46 of the walls. By mechanism not shown the body block 160 and foot plate 150 are movable, making possible the removal of the product cast in the mold, as 160$^a$. This product comprises the type body 160$^b$ and the tang 160$^c$, which connects the component elements of the product if it comprises more than one unit in the mold or line, as shown in Figures 7, 8 and 11.

The dotted line 14$^b$ in Figure 10 indicates that the matrices may be double. This is further illustrated in Figure 12 in which a double matrix is shown. Two sizes or two styles of type may be used in this form of matrix.

The recesses in the dividing walls, as 46 in Figure 4 and in Figure 5, may be of greater or less depth in accordance with the uses to which the main dividing walls are put, and the larger the type employed, the deeper will be the recess in order that the foot plate 150 may always extend beneath the entire lower surface of the type body to be cast to prevent the escape of the type metal through an aperture.

Special attention is directed to the adjustable justifying spacer shown in Figures 2, 3, 9, 16 to 22, and 35, which spacer is formed with a casting recess having no side walls, but which has one rear wall for molding one side of the type body cast therein, and it also has a shoulder for molding the upper surface of the type body.

The adjustable spacer proper is designated as 30, and comprises a block member 31, a lug member 32, and a wedge member 33. The recess 34 serves as a continuous surface against which the type metal is molded, whatever position of adjustment the space or wedge thereof may assume, whether expanded or reduced to normal, as when the wedge is withdrawn. This object is attained by the peculiar formation of the wedge 33, on which are tongue members 33$^a$ and 33$^b$ which are narrower than the wedge, and are disposed in grooves 31$^a$ and 32$^a$ in the members 31 and 32 respectively, whereby the side of the wedge 33 is made to come flush with the surface of the members 31 and 32 at the recessed portion of the spacer. In all the views the thickness of the justifying spacer is exaggerated, in order to show the construction more clearly.

A stud 32$^b$ is fixed in the lug member 32 and is disposed in a hole therefor, as 31$^b$ in the block member 31 which prevents relative longitudinal displacement of the members 31 and 32. A stud 33$^c$ is provided upon the wedge 33 to prevent the wedge from being withdrawn from the spacer members. A recess 31$^c$ in the block member 31 and a corresponding recess 32$^c$ in the lug member 32 accommodate the stud 33$^c$ in said wedge 33 and permit the wedge to be withdrawn to the extent that the extreme end will not extend beyond the bottom of the V-shaped recess in the spacer, as at 33$^d$.

An extension 35$^a$ upon the lug member 32 of the adjustable spacer 30, disposed at a right angle therewith in the direction of the block member 31, contacts with the under surface of the shoulder 35 thereof, forming a closure at this point and covering the aperture, as at 35$^b$, between the members 31 and 32 when the spacer 30 is extended by the insertion of the wedge 33 between the members 31 and 32. This feature is clearly shown in Fig. 18 of the drawings.

The adjustable spacer is constructed so that the tip of the wedge 33 is permitted to drop below the base of the V-shaped space as at 33$^d$, between the ears or lugs of the member 32. This makes it possible to clear the levelling bar at the transfer point between the first and second elevators.

In Figure 35 is shown a double adjustable spacer 50, having two casting recesses 51 and 51$^a$, and shoulders 55 and 55$^a$.

The casting recess 51 is of different depth than the casting recess 51$^a$. The base portions of the block member 52 and the lug member 53 are bevelled, as at 52$^a$ and 53$^a$, to prevent the spacers from catching on other parts of the machine when assembling, etc.

*Hand-set matrices*

Figures 24, 25, 27:
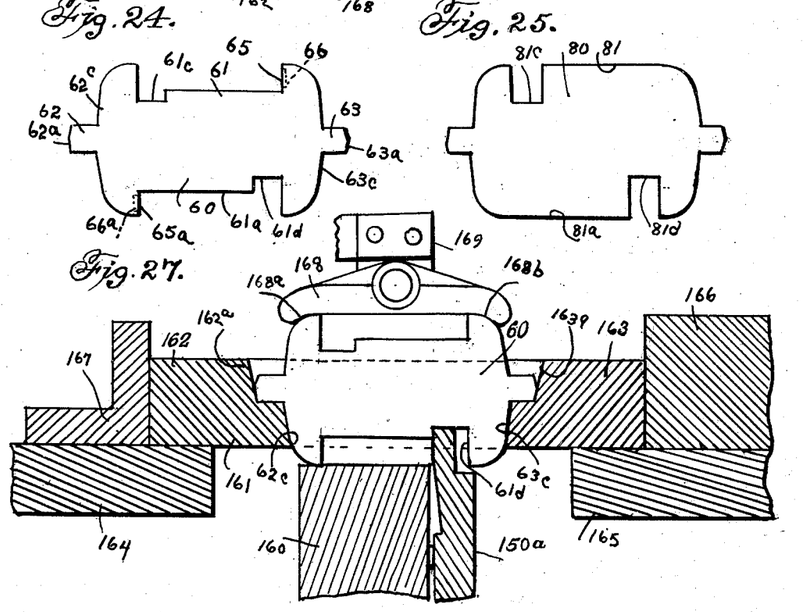
Fig. 24 is a double matrix of the kind employed for setting by hand.
Fig. 25 is a double division wall of the kind set by hand.
Fig. 27 is a transverse sectional view of the composing stick on a larger scale, with matrices therein showing the position for casting in the machine.

For hand setting I have modified the matrices, dividing walls and spacers as shown in Figures 24, 25, 27 and 29 to 32 inclusive. In Figure 24, 60 indicates the matrix, which is preferably made as a double matrix by providing recesses 61 and 61$^a$ therein. A deeper recess as 61$^c$ and 61$^d$ is provided at the base of the recess 61 and 61$^a$ to receive the foot plate 150$^a$ shown in Figure 27. Shoulders 65 and 65$^a$ are provided in which the character dies are formed, as 66 and 66$^a$, shown by dotted lines in Figure 24.

The matrices are provided with extensions or lugs, as 62 and 63, which are bevelled as at 62$^a$ and 63$^a$. The end portions of the matrices are correspondingly bevelled as at 62$^c$ and 63$^c$, making them more suitable for handling, setting and distributing out of the stick or holder as 161 shown in Figures 23, 26, 27, 27$^a$ and 28. The stick is provided with channel members 162 and 163 with inclined walls as 162$^a$ and 163$^a$, and a recess is provided between the side walls through which one side of each of the matrices is exposed for the casting operation. In the fragmentary view, Figure 27, the holder with a line of matrices therein is shown in the casting position in cross-section in its relation to parts of the casting machine in which it is employed. 164 and 165 indicate supporting members; 166 a retaining member; and 167 an adjustable retaining member. Above the matrices is a clamping member 168 pivoted upon the end of a clamping arm 169. The clamping member 168 is curved at 168$^a$ and 168$^b$ to conform to the rounded portions of the matrices.

In Figure 27 the foot plate 150$^a$ and body block 160 are shown in the position for casting; the foot plate 150$^a$ disposed in the recess 61$^d$ of the matrix 60. The product cast by this method is the same as that cast with the style or class of matrices hereinbefore described, which are used as circulating matrices, excepting that it is designed to use the style of matrices used in hand setting.

Figure 23:
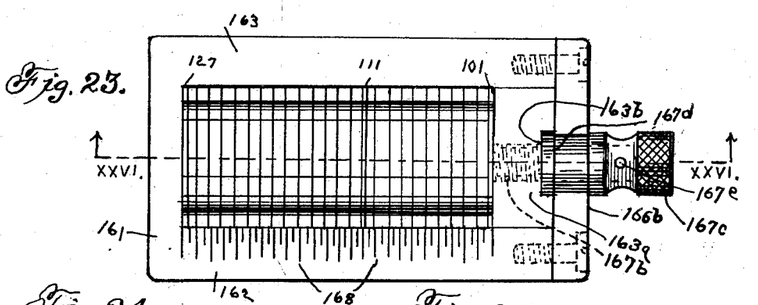
Fig. 23 is a plan of a stick for assembling hand-set matrices showing matrices assembled therein.

The stick has a slidable cross-head 163ª, mortised at 163ᵇ, and a cross bar 166ᵇ secured to the side members 162 and 163, a threaded member or screw 167ᵇ seated in with a knurled nut thereon 167ᶜ, and a flange 167ᵈ thereon held in the mortise 165ª. The knurled nut 167ᶜ is held on the end of the threaded member, by a pin 167ᵉ. By means of the cross-head 163ª and the adjusting screw 167ᵇ, the required pressure may be exerted upon the composed line of type. A scale as 168, Figure 23, is provided for determining the length of the line, etc. The cross section of the end of the screw 167ᵇ may be made square, as shown at 167ᶠ in Figure 26 to prevent turning in the knurled nut.

In Figure 29 I have shown the spacer used with the hand-set matrices hereinafter described, in which 70 indicates the spacer, 71 and 71ª recesses corresponding with recesses 61 and 61ª of the matrices. 71ᵇ and 71ᶜ indicate the recesses for the foot plate 150ª of the casting mechanism. In all other respects the spacer is the same in the form and construction and corresponds with the matrices excepting that there is no character strike and the shoulder 75ª extends lower than the corresponding shoulder of the matrix 65ª. These spacers or quads may be of standard thickness the same as those used in machines which employ circulating matrices.

In Figs. 25 and 30 are shown the division walls used with my improved form of handset matrices, in which 80 indicates the dividing wall and 81ᶜ and 81ᵈ the recesses which correspond with recesses 61ᶜ and 61ᵈ of the other matrices for admitting the foot plate 150ª of the casting mechanism. The dividing walls have no recess between the recesses 81ᶜ and 81ᵈ and the upper or shoulder portion, to correspond with the recesses 61ᶜ and 61ᵈ of the matrices, but the wall portions indicated as 81 and 81ª, are intact and are disposed in a composed line between the spaces or recess of the matrices, in which body of the type is cast, as 61 and 61ª. Thus when a dividing wall 80 is inserted between two matrices, as 60, the product is divided thereby, whether between words, or other groups of characters, or individual letters, diphthongs or other single characters. And on the other hand when a spacer, as 70, is used the product is not divided thereby but merely extended or spaced according to the thickness of the spacer or spacers used.

It is obvious that in setting certain matter a line might be composed almost entirely of spacers and thus there would be no molded characters where the spacers occurred, and accordingly a blank slug may be produced by setting an entire line of spacers.

By shortening the recess of the spacers as at 71ª, that is by making the shoulder, 75ª, longer, a low quad can be cast therewith separately. A low slug can be cast by using spacers of the desired height, without matrices or division walls.

To cast lines of separate quads or spaces the spacers are used with dividing walls between. Such lines are used in making ruled forms.

In Figure 32 the adaptation of my hand set matrices for casting large type is shown, in which 90 indicates the matrix, 91 the casting recess, 91ª the recess for the foot plate 150ª, and 95 is the shoulder in which the character is struck. The use of single matrices for large sized type admits of increasing the height of the character beyond one half the shorter dimension of the matrix. The body size of the character cast may be equal to any portion of the width of the matrix so long as enough metal is reserved to give sufficient strength to the matrix. For example in Figure 32 the "W" in the matrix 90 extends almost to the center line thereof. In Figure 31, 60ª indicates the portion of metal between the opposite recesses, as 61 and 61ª. If the height of the character equals or exceeds approximately one half of the distance across the matrix, then the matrices should be made as single matrices; otherwise the matrices if made double would have insufficient metal to support the end portions of the matrices and hold them intact. And again if the height of the letters or characters as "W" were still increased they would extend beyond the center line of the matrices, but in a single matrix the character as "W" might be double the height of the character shown and by increasing the thickness of the matrix proportionately it would be possible to cast characters twice the size of the "W" shown in Figure 32.

It will be obvious that these hand-set matrices may be used to set very small or very large type without increasing the length or breadth of the matrices, but by merely increasing the depth of the recesses for casting and increasing proportionately the thickness of the matrices, as shown in Figure 32.

Figure 26:
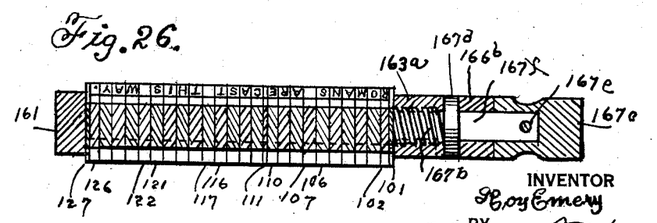
Fig. 26 is a section taken on line XXVI—XXVI of Fig. 23.

In Figure 26 I have shown in a longitudinal sectional view a composed line of matrices for casting roman type for the words:

"ROMAN IS CAST THIS WAY".

Figure 27A:
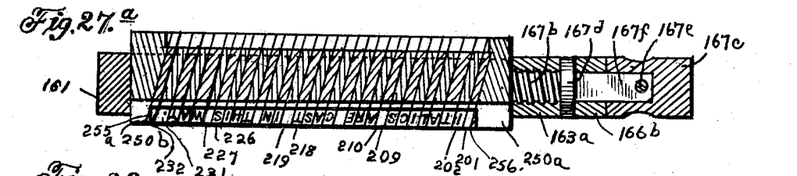
Figure 28:
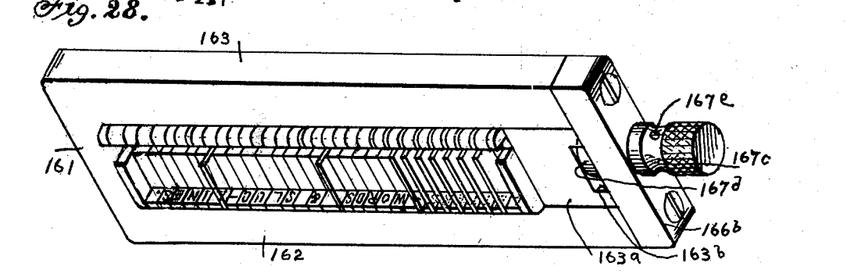
Fig. 28 is a perspective of a stick with an assembled line of matrices.

I have provided means whereby italic characters may be cast from hand-set matrices hereinbefore described as follows: In Figure 27ª, which is a longitudinal sectional view similar to Figure 26 but in an inverted position, I have shown a composed line of matrices for the words:

"ITALICS ARE CAST IN THIS WAY".

For casting closely set italics special matrices with italic characters cut therein, and with bevelled edges shown in this figure, are used. Matrices for casting the usual slightly spaced italic characters are the same as the matrices for casting straight characters hereinbefore described.

Spacers used with the close-set italic matrices are bevelled at the edges in the same manner as the matrices carrying the characters.

Figures 33 and 34 show a pair of auxiliary members which are employed, one at each end of the line but in different positions, for forming rectangular ends upon the slug lines cast from the composed line of close-set italic type matrices shown in Figure 27$^a$.

These auxiliary units I designate "italic rectifying walls", but for brevity may be referred to as "italic walls". The thickness of these walls is exaggerated in the drawing in order to show the shape more clearly.

The italic wall as a unit is designated as 250, and in outline it corresponds in shape with the division wall 80 shown in Fig. 30, having recesses as 251, 251$^a$, lugs 252, 253, with ends bevelled as at 252$^a$, 253$^a$, and rounded bevelled ends of matrices as 252$^b$, 253$^b$; and rounded corners as 252$^c$, 253$^c$. The cross-section of the italic wall is substantially a right triangle. The hypotenuse of the triangle, the inclined surface, as 254, is disposed towards the matrices in both ends of the stick, one italic rectifying wall being in the normal position, as at the left at 250$^a$, and the other being in the inverted position, as at the right at 250$^b$, Fig. 27$^a$. At the acute angle of the rectifying wall, or along the upper portion thereof, as shown in Figure 33, is a rectifying element 255, being an extension having a vertical surface 255$^a$ extending from the recess 251$^a$ of the unit a distance equal to the length of the type body, or the length of recess 71, or 71$^a$ of the spacer 70 in Figure 29; in height equal to the body size of the type to be cast, that is to say of equal depth to the shoulder of the type matrix, as 65 in Figure 24, or as 250$^b$ in Figure 27$^a$. But allowance must be made in this comparison or measurement for the inclination of the italic character matrices as shown in Figure 27$^a$ of the drawings. This vertical extension serves to form a rectangular end of the product cast in the mold or composed line of italic matrices at the left, as at 255$^a$.

At the base side of the triangular unit, or italic rectifying wall, is a second rectifying element 256 in the form of a vertical surface forming a depression or recess below the surface of the inclined plane of the unit and having the same dimensions as the surface 255$^a$. This vertical plane at the base of the unit, when assembled in the composed line serves to form a rectangular end at the beginning of the line or at the line or at the right as at 255$^b$.

In Figures 36 to 40 inclusive I have illustrated the manner of using the hand-set matrices, spacers, and dividing walls for casting type in machines of the character that employ circulating matrices. The matrices, spacers and dividing walls may be the same as those hereinbefore described and shown for use in hand-set machines excepting that the units employed as here shown for setting in machines in which circulating matrices are ordinarily used may be smaller than the units used on the hand-set machines.

In order to use my hand-set matrices for casting in the most used kind of circulating matrix machines, I provide a holder or stick for the matrices which can be inserted in the first elevator jaw.

Figure 36:
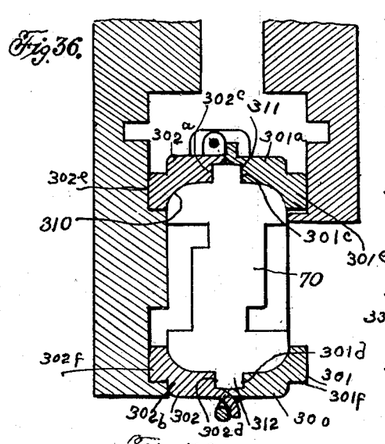
Fig. 36 is a sectional view showing matrices of the kind used for setting by hand disposed in a holder or stick of modified construction which fits in a circulating matrix machine elevator, for casting.
Figure 37:
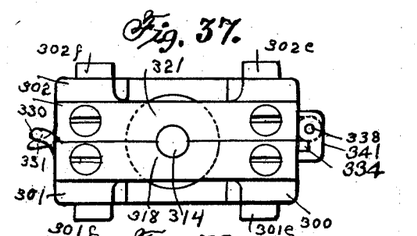
Fig. 37 is an end view of the stick employed for casting as illustrated in Fig. 36.
Figure 38:
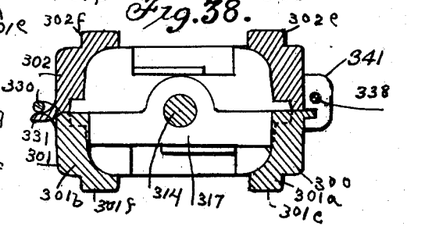
Fig. 38 is a sectional view taken on line 38—38 of Fig. 40.

Figure 36 is a fragmentary view in section of the first elevator jaw of a circulating matrix machine, with a stick containing a line of composed mold elements disposed therein for casting. The section of the stick is taken on the line 36—36 of Fig. 40. The stick 300 slides into the elevator jaw so that a cast can be made therefrom in similar manner as that hereinbefore described. It is necessary therefore to describe only the stick in order to show the adaptation of my hand-set matrices for use in the machines in which circulating matrices are used.

The holder 300 comprises two detachable mating members 301 and 302. Member 301 is used as a stick for composing the matrices in a line, then the mating member 302 is placed in position and suitably secured, and now the composed line is ready to place in the first elevator jaw for casting. Each of the members 301 and 302 has spaced parallel side members, 301$^a$, 301$^b$, and 302$^a$ and 302$^b$ which are formed to fit the matrices, as 310, Fig. 36. Channels as 301$^c$, 301$^d$, 302$^c$ and 302$^d$ retain the bevelled ends 311, 312 of the matrices. The dimensions of the parts 301 and 302 are such that when the matrices are set therein, each of the mating members 301 and 302 extends to the center line of the matrices, and form a housing for the composed line of matrices.

Means for justifying and locking up the line are provided as follows: Assuming that 302 has been removed and 301 is being used for assembling or setting matrices in a line, the matrices and division walls are set in proper order with suitable spacers interspersed. If the line does not justify other spacers may be inserted or substituted as required to justify the line. Then the line is clamped in the holder.

To provide for clamping the line in the stick a crosshead 313 is slidably held in the part 301 and a screw 314 is threaded therein. A mortice or recess 315 is provided in member 301 adapted for admitting a knurled nut 316 on the screw 314. A support for the screw 314 and knurled nut is provided in the form of a bridge element 317 across the space between 301ª and 301ᵇ. A crossbar 318 is secured to member 301 by screws 319 and 320, and a corresponding crossbar 321 is secured to the ends of the side members 302ª and 302ᵇ of member 302. A recess is provided in each of said crossbars 318 and 321 to receive the end of the screw 314. The screw 313 and knurled nut thereon are retained against longitudinal displacement by the bridge element 317 and the crossbars 318 and 321, so that when rotated the cross-head 313 is moved in the channels as required to clamp or release the matrices in the line.

When a line has been composed, justified, and clamped in the stick member 301, member 302 is placed in position and secured. The stick is then ready to place in the first elevator for casting.

To provide for holding the composed line and stick in proper position for casting, and at the same time insure sufficient pressure to bind the matrices closely and firmly together one against the other I provide a cross-head 322 in the end of member 301 (at the left in the drawing) and which is slidable in the channels of the side members 301ª and 301ᵇ of member 301, and in corresponding side members 302ª and 302ᵇ of member 302 when assembled in position. In the end wall 301ᶜ of member 301 are two rods 323 and 324 slidably held in openings therethrough, and having their ends rigidly held in the cross-head 322. To the opposite ends of said rods is rigidly secured a cross-head 325. Thus when the rods are moved in either direction they must carry said cross-heads with them. Between the end-wall 301ᶜ and the cross-head 325 an extensible spring is disopsed around each of said rods, as 326 and 327, which normally hold the cross-head 322 in contact with the end-wall 301ᶜ of member 301.

Figures 39, 40, 41:
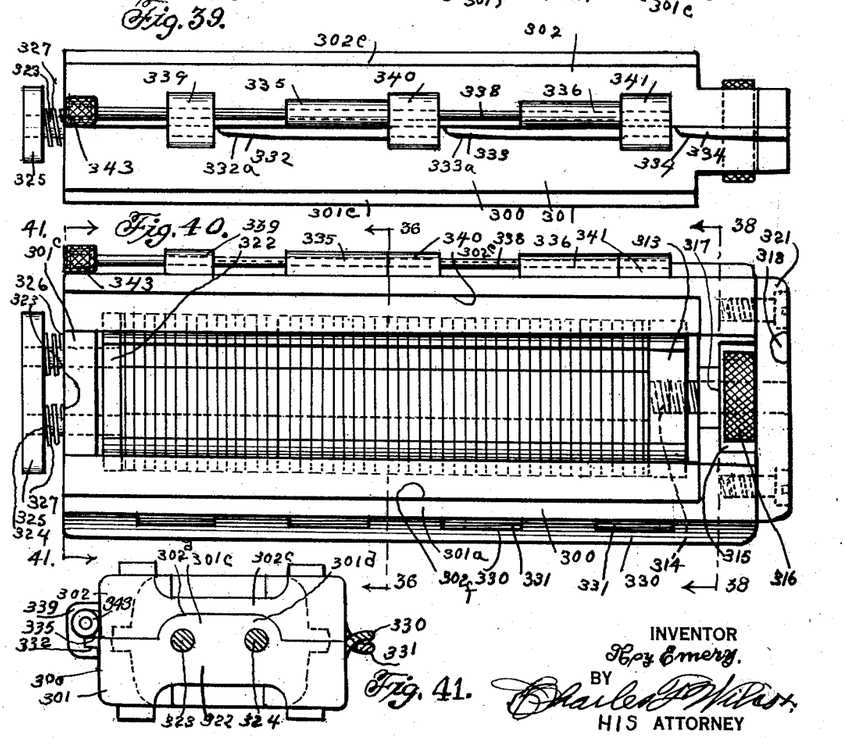
Fig. 39 is a rear view of the stick shown in Figs. 36 to 40 inclusive.
Fig. 40 is a plan of the stick shown in Figs. 36 to 39.
Fig. 41 is a sectional view through the line 41—41 of Fig. 40 showing the construction of the clamping members of the stick.

In Figure 40 of the drawings the cross-head is shown a slight distance removed from the end-wall 301ᶜ to indicate its function, but when the line is being composed in the stick it impinges against the end-wall 301ᶜ of member 301 by force of said springs. The said cross-head 322 maintains the same position when the matrices are clamped in the stick member 301 by the threaded screw 313 and the cross-head 317.

But when the stick containing the composed line is disposed in the elevator and in readiness for casting it is clamped between the vise jaws and one of said jaws (not shown), engages the cross-head 325, at one end of the stick and the other jaw (not shown) engages the crossbars 318 and 321 at the opposite end of the stick. When pressure is exerted by these jaws the cross-head 322 is forced inwardly against the matrices in the line and moved away from the end-wall 301ᶜ of member 301, as shown in Figure 40.

Referring to Figure 41, rods 323 and 324 are supported entirely by the end wall 301ᶜ of member 301. An extension 301ᵈ is provided to accommodate said rods. A recess 302ᵈ is provided in the end wall 302ᶜ of the member 302 to accommodate the extension 301ᵈ.

To secure the members 301 and 302 together I provide a series of loops 330 upon the member 301 and a series of interfitting fingers or hooks upon the member 302 at 331 which admit of a hinge-like engagement of the said members.

To lock the members 301 and 302 in gaged relation clamping means are provided, as follows: on member 301 flanges, as 332, 333, and 334; on member 302, lugs as 335 and 336. A rod 338 is slidably disposed in said lugs and a series of clips 339, 340 and 341 are rigidly secured upon said rod. A flange on the said clips extends below the stick flanges, and when the rod 338 is moved in the direction of the stick flanges, said stick flanges are engaged by the clip flanges. The lower surfaces of the stick flanges are slightly inclined, as at 332ª, 333ª, 334ª, whereby a wedge-like cam action is produced and the parts are forcibly clamped together when the clips are set in the engaging position upon said flanges. A knurled nut 343 is provided upon the end of the sliding rod 338. A sufficient space is provided between the flange members 332, 333 and 334 to permit readily assembling the members 301 and 302.

Upon members 301 and 302 are guides or rails 301ᵉ, 301ᶠ, 302ᵉ, 302ᶠ, respectively, which serve to guide the stick and keep the composed line locked therein adjusted in the first elevator as required for the casting operation, said guides or rails serving the same purpose as the ears and toes on a composed line of circulating matrices when they are in the casting position.

While I have described certain structural and mechanical forms in the foregoing specification, I wish to make it clearly understood that I do not limit my invention to such structural and mechanical forms, but reserve the right to depart therefrom or supplement the same with additional or auxiliary forms within the spirit and scope of this invention.

Having thus described my invention, what I claim and desire to secure by Letters Patent of the United States is:

1. A composite mold for casting a divided, justified line of type, comprising matrix elements, spacing elements, and variable spacing elements for forming the top and one side of the type; walls for forming the adjacent sides; a foot plate for forming the bottom; and a body block for forming the opposite side.

2. A composite mold for casting an integral, justified line of type, comprising matrix elements, spacing elements, and variable spacing elements for forming the top and one side of the type line; a foot plate for forming the bottom, and a body block for forming the opposite side.

3. A composite mold for casting a divided, justified line of type, comprising matrix elements, and variable spacing elements for forming the top and one side of the type; walls for forming the adjacent sides, a foot plate for forming the bottom, and a body block for forming the opposite side.

4. A composite mold for casting an integral, justified line of type, comprising matrix elements and variable spacing elements for forming the top and one side of the line, a foot plate for forming the bottom, and a body block for forming the opposite side.

5. A composite mold for casting a divided, justified line of type, comprising matrix elements, and spacing elements for forming the top and one side of the type, walls for forming the adjacent sides, a foot plate for forming the bottom, and a body block for forming the opposite side.

6. A composite mold for casting an integral, justified line of type, comprising matrix elements, and spacing elements for forming the top and one side of the line, a foot plate for forming the bottom, and a body block for forming the opposite side.

7. A composite mold for casting type, comprising matrix elements for forming the top and one side of the type, walls, a foot plate for forming the bottom and a body block for forming the opposite side.

8. In a composite typographical mold, a matrix element having a longitudinal surface, parallel to its center line, for forming one side of the type and a matrix at right angles thereto.

9. In a composite typographical mold, a spacing element having a longitudinal surface, parallel to its center line, for forming one side of a typographical space and a surface perpendicular thereto for forming the top.

10. In a composite typographical mold, a variable spacing element having a longitudinal surface for forming one side of a typographical space, a surface perpendicular thereto for forming the top, and means for extending said surfaces.

11. In a composite typographical mold, means for dividing the casting, comprising a transverse wall having an edge parallel to its center line and having a recess for admitting a foot plate.

12. In a composite typographical mold, a variable spacing element having a longitudinal recess parallel with the center line, with a rear wall and a projecting shoulder; said element embodying a lug member, a block member and a wedge member adjustable therebetween, a stud for retaining the lug member and block member in proper relative position while being adjusted, flush joints between said lug, block and wedge members in the rear wall of said recess, means for bridging the gap at said shoulder between the lug and block members when they are in extended relation.

13. A composite mold for casting an integral, justified line of type, comprising matrix elements, spacing elements, and variable spacing elements, for forming the top and one side of the line; walls for forming the ends; a foot plate for forming the bottom, and a body block for forming the other side.

14. A composite mold for casting an integral, justified line of type, comprising matrix elements and variable spacing elements for forming the top and one side of the line; walls for forming the ends of the line; a foot plate for forming the bottom, and a body block for forming the other side.

15. A composite mold for casting an integral, justified line of type, comprising matrix elements and spacing elements for forming the top and one side of the line; walls for forming the ends of the line; a foot plate for forming the bottom, and a body block for forming the other side.

Signed at Brooklyn, city of New York, in the county of Kings and State of New York, this fourth day of September, A. D. 1926.

ROY EMERY.